July 31, 1923.
1,463,626
A. MARRAZZO
AGITATING MACHINE
Filed May 24, 1923
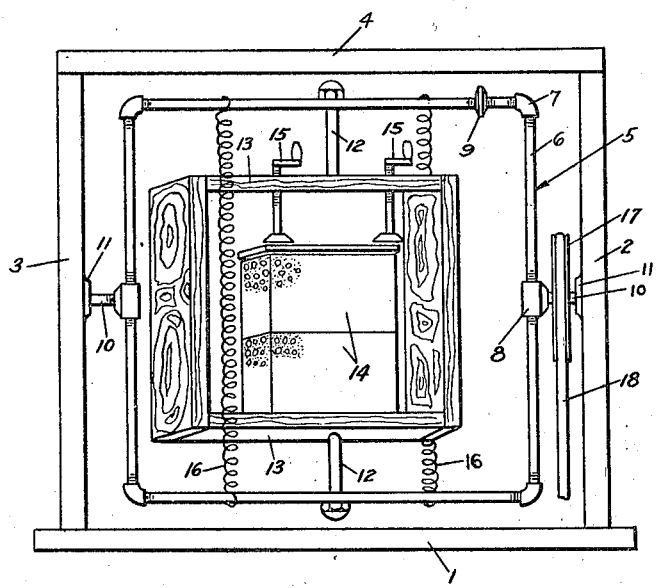
INVENTOR
ANTONY MARRAZZO
BY
Michael Hertz.
ATTORNEY Patented July 31, 1923.

1,463,626

UNITED STATES PATENT OFFICE.

ANTONY MARRAZZO, OF NEW YORK, N. Y.

AGITATING MACHINE.

Application filed May 24, 1923. Serial No. 641,041.

*To all whom it may concern:*

Be it known that I, ANTONY MARRAZZO, a subject of the King of Italy, and who have declared my intention of becoming a citizen of the United States of America, and a resident of New York, New York, have invented an Improvement in Agitating Machines, of which the following is a specification.

This invention relates to agitating machines and is particularly adaptable for use in the manufacture of molded materials made up of a plastic compound which has been placed in a mold to harden. In the past the difficulty has been that as the plastic compound hardened, the same would shrink and thus either not fill the mold completely or else would leave air gaps on the surface, thus not leaving a smooth outer surface. This latter fault is decidedly objectionable in the manufacture of artificial fruit, etc. made of the plastic material.

In order to have the compound fill the mold, it has hitherto been the practice to shake the same by hand with an irregular motion. But this process is tiresome and when the mold is heavy, very fatiguing. Machines to do this, prior to this invention, did not operate successfully because of a uniform motion imparted to the mold, with the consequence that the plastic compound would not fill the mold completely.

The machine constructed in accordance with this invention overcomes these faults and furthermore enables the production of molded articles with less material than would be required by means of other machines.

One of the objects of my invention therefore is to provide a machine for distributing the plastic material in a mold so that the exterior surface of the molded article will be smooth.

Another object of my invention is to provide a mechanism that will produce hollow molded articles.

Other and further objects will appear after reading the following specification and claims in connection with the accompanying drawing in which—

1 represents a bench, on which is mounted a supporting framework consisting of two uprights 2 and 3 connected by a tie member 4. Rotatably supported by the uprights is a revolvable framework 5, in this instance shown as composed of pipe tubing 6, the sections being connected together by elbows 7 and T's 8, the final sections of tubing being connected by a union 9. The entire framework revolves about a horizontal axis which is coincident with the short pieces of piping 10 journaled in boxes 11, mounted on the uprights 2 and 3. Although I have shown the revolvable framework as built up of sections of piping, it is of course apparent that the same may be of other material, as for example, a casting of suitable proportion.

Pivoted within the revolvable framework on vertical pivots 12 is the mold supporting housing 13 in this instance shown as a wooden box-frame having four sides with no front or back. In order to secure the multi-part mold 14 within the frame, there are provided two clamping members 15, and a suitable board or the like is interposed between the clamping members and the mold to distribute the pressure of the clamping members evenly over the latter.

Suitably fastened to the framework 5 is a pair of springs 16 of suitable stiffness, one in front of and one in back of the boxframe; and mounted on one of the short pieces of piping 10 is a sheave 17 over which is trained a belt 18, adapted to be driven by a motor, not shown.

In operation, the mold is properly filled with the plastic compound and fastened within the boxframe by means of the clamping members 15 so that the centre of gravity of the boxframe and its contents is slightly off the vertical axis through the pivots 12. The motor is then started and the framework 5 begins to revolve on its horizontal axis. As this framework revolves the boxframe lists to one side and finally impounds on one of the springs 16. This checking of the motion of the boxframe causes the plastic compound within the mold to splash up against the confining walls. As the frame is revolved, the boxframe is thrown against the other of the springs to again splash the material. This action of the box is not regular however, as there is no positive force tending to throw the boxframe from one side to the other. For this reason, the compound within the mold at times, as it hardens, has an opportunity to distribute itself evenly over the surface of the wall. The function of the springs is to cushion the blow of the boxframe so that no injury may result thereto or to the mold containing the plastic compound.

Having thus described my invention, what I claim as new is:

1. An agitating machine comprising a mold retaining mechanism means for removably securing the mold thereto and means for imparting to the mold retaining mechanism a rotative motion about two axes.

2. An agitating machine comprising a mold retaining mechanism and means including the force of gravity for imparting to the mold a rotative motion about two axes.

3. An agitating machine comprising a mold retaining mechanism, positive driving means for rotating the mold about an axis, rotative movement about another axis being affected by the force of gravity as the mold is revolved by said positive driving means.

4. An agitating machine comprising a frame, means for retaining a mold within said frame, driving means for rotating the frame about one axis, and pivotal means holding the frame to enable the frame to oscillate about an axis inclined to the aforementioned axis.

5. An agitating machine comprising a frame, means for removably retaining a mold within said frame, pivotal means for connecting said frame with another frame, pivotal means supporting said other frame and driving mechanism for said other frame.

6. An agitating machine comprising a frame, means for retaining a mold within said frame, pivotal means for connecting said frame with another frame, resilient mechanism secured to said other frame and within the path of movement of said first frame, pivotal means supporting said other frame and driving mechanism for said other frame.

7. An agitating machine comprising a frame, means for retaining a mold within said frame, pivotal means for connecting said frame with another frame, a coiled spring tensioned between the members of said other frame and within the orbit of pivotal movement of said first frame, pivotal means supporting said other frame and driving mechanism for said other frame.

8. An agitating machine comprising a supporting framework, a frame supported thereby revolvable about a horizontal axis, a second frame pivotally supported by said revolvable frame and oscillatable about a vertical axis, driving mechanism for said revolvable frame, a stop for limiting the motion of said oscillatable frame, and clamping means mounted in said oscillatable frame.

In testimony whereof, I have signed my name to this specification this 18th day of May, 1923.

ANTONY MARRAZZO.